United States Patent [19]

Nishio et al.

[11] Patent Number: 4,570,676
[45] Date of Patent: Feb. 18, 1986

[54] LUMBAR SUPPORT AIR VALVE ASSEMBLY

[75] Inventors: Shigeru Nishio, Kariya; Nobuyuki Hashimoto, Toyota, both of Japan

[73] Assignee: Aisin Seiki Kabushiki Kaisha, Kariya, Japan

[21] Appl. No.: 476,756

[22] Filed: Mar. 18, 1983

[30] Foreign Application Priority Data

Mar. 18, 1982 [JP] Japan ................................ 57-43367

[51] Int. Cl.$^4$ .............................................. F16K 11/14
[52] U.S. Cl. .................................... 137/870; 137/881; 297/284; 297/DIG. 3
[58] Field of Search .................. 5/453, 454, 455, 456; 137/522, 596.17, 870, 881; 297/DIG. 3, 284

[56] References Cited

U.S. PATENT DOCUMENTS

| | | | |
|---|---|---|---|
| 2,136,510 | 11/1938 | Jensen | 297/284 X |
| 2,998,817 | 9/1961 | Armstrong | 297/DIG. 3 X |
| 3,348,880 | 10/1967 | Swann | |
| 3,446,203 | 5/1969 | Murray | 5/453 X |
| 3,667,075 | 6/1972 | Ballard et al. | 5/456 |
| 3,784,994 | 1/1974 | Kery | 297/284 X |
| 4,169,295 | 10/1979 | Darling | 5/453 X |
| 4,190,286 | 2/1980 | Bentley | 297/284 |
| 4,491,157 | 1/1985 | Hashimoto | 137/881 X |
| 4,491,364 | 1/1985 | Hattori et al. | 137/881 X |

FOREIGN PATENT DOCUMENTS 1257252 2/1961 France .

Primary Examiner—Gerald A. Michalsky
Attorney, Agent, or Firm—Sughrue, Mion, Zinn, Macpeak & Seas

[57] ABSTRACT

A lumbar support air valve assembly is comprised of a housing having a chamber therein adapted to be connected to a source of air under pressure. A plurality of outlet ports are provided through the housing corresponding in number to the number of air bags located in the lumbar support region of an automobile seat back. The passage of pressurized air to the outlet ports is controlled by a check valve associated with each outlet port. A pressure relief valve is provided for limiting the pressure within the chamber and the individual air bags to a pre-determined value. A solenoid actuator is associated with each check valve within the housing so that on operation of the solenoid actuator by means of a switch located at a remote location on or near the dash board a solenoid actuator will cause the respective check valve to open. The energization of each solenoid actuator to open a check valve simultaneously opens an exhaust port for reducing the air pressure within the air bag associated therewith.

2 Claims, 3 Drawing Figures

U.S. Patent  Feb. 18, 1986  4,570,676

LUMBAR SUPPORT AIR VALVE ASSEMBLY

BACKGROUND OF THE INVENTION

The present invention is directed to a lumbar support air valve assembly and more particularly to a lumbar support air valve assembly for selectively controlling the degree of pressurization of a plurality of air bags located in the lumbar support region of a seat back for controlling the contour thereof to suit individual requirements.

A conventional lumbar support air valve assembly is shown in FIG. 1 of the present application wherein a controlled lock is provided with an inlet port 2 which receives air from a pressurized air source. The air is transmitted to the spaces 1 in the block past the ball check valve 3, air filter 4, check valve 5, chamber 6, check valves 7 and air filters 8. Each space 1 is connected to an inflatable air bag 11, three of which are shown in FIG. 2 by means of suitable pipes so that each air bag receives a supply of pressurized air. When the air pressure within the chamber 6 exceeds a pre-determined value, a regulator valve 9 opens so that the excessive air pressure is relieved through the port 10. Thus, the air pressure within each air bag 11 will not increase above the pre-determined value. Push buttons 13 corresponding to check valves 7, respectively, are provided at the side of the seat back 12. When one of the push buttons 13 is pushed, the associated check valve 7 is opened by means of an associated push rod 14. Therefore, the air pressure within the associated air bag 11 will be relieved through the space 1, air filter 8, check valve 7, chamber 6, orifice 15, air filter 4 and the outlet port adjacent the ball 3. It is noted that under the above conditions the port 2 is disconnected from the pressurized air source. Accordingly, by pushing selected buttons, the degree of inflation of the various air bags 11 can be controlled to suit the individual requirements.

However, in the conventional lumbar support air valve assembly described above, it is difficult to manipulate the push buttons when they are positioned on the side of the seat back. If the push buttons are provided on the dash board of a vehicle the ease of manipulation will be improved, but an extensive arrangement of air pipes is then required between the seats and the dash board for supplying the pressurized air to the various air bags. It is extremely difficult to arrange such air pipes within the limited space available.

SUMMARY OF THE INVENTION

The present invention provides a new and improved lumbar support air valve assembly which obviates the afore-mentioned drawbacks in a simple, economical and efficient manner.

The present invention provides a new and improved lumbar support air valve assembly which is easy to manipulate and which is comprised of a housing having an inlet port adapted to be disposed in fluid communication with a source of air under pressure and outlet ports which are in fluid communication with a plurality of air bags positioned in the lumbar region of a seat back, check valves positioned between said inlet port and said outlet ports so as to permit the transmission of pressurized air to said air bags respectively from said source of air, solenoid actuators positioned within said housing with each actuator corresponding to a respective check valve, and each of said solenoid actuators having a push rod moveable in response to the application of electric current to thereby engage and move the associated check valve to its open position.

The foregoing and other objects features and adVantages of the invention will be apparent from the following more particular description of a preferred embodiment of the invention as illustrated in the accompanying drawings.

DETAILED DESCRIPTION OF THE INVENTION

Figure 1:
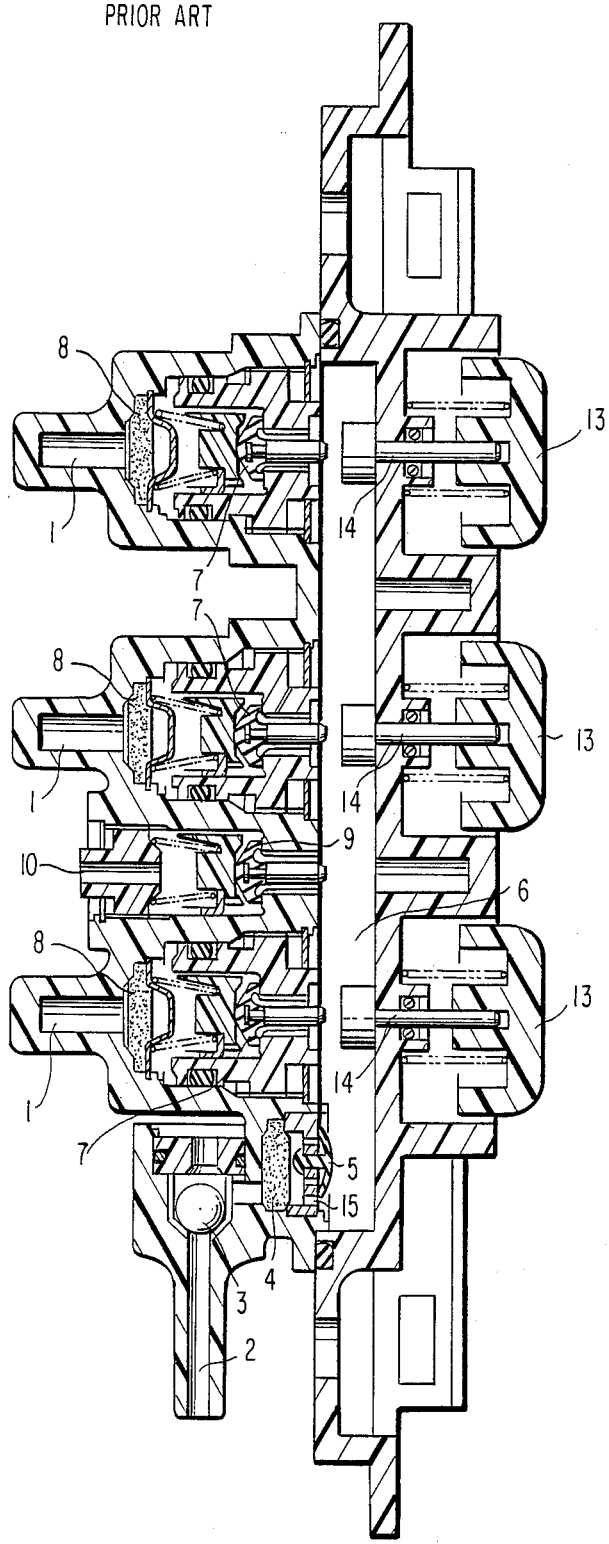
FIG. 1 is a cross-sectional view of a conventional lumbar support air valve assembly.
Figure 2:
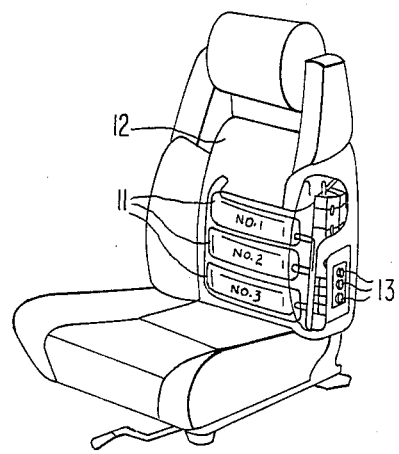
FIG. 2 is a perspective view of an automobile seat having a plurality of air bags located in the lumbar region of the seat back with the air valve assembly of FIG. 1 incorporated therein.
Figure 3:
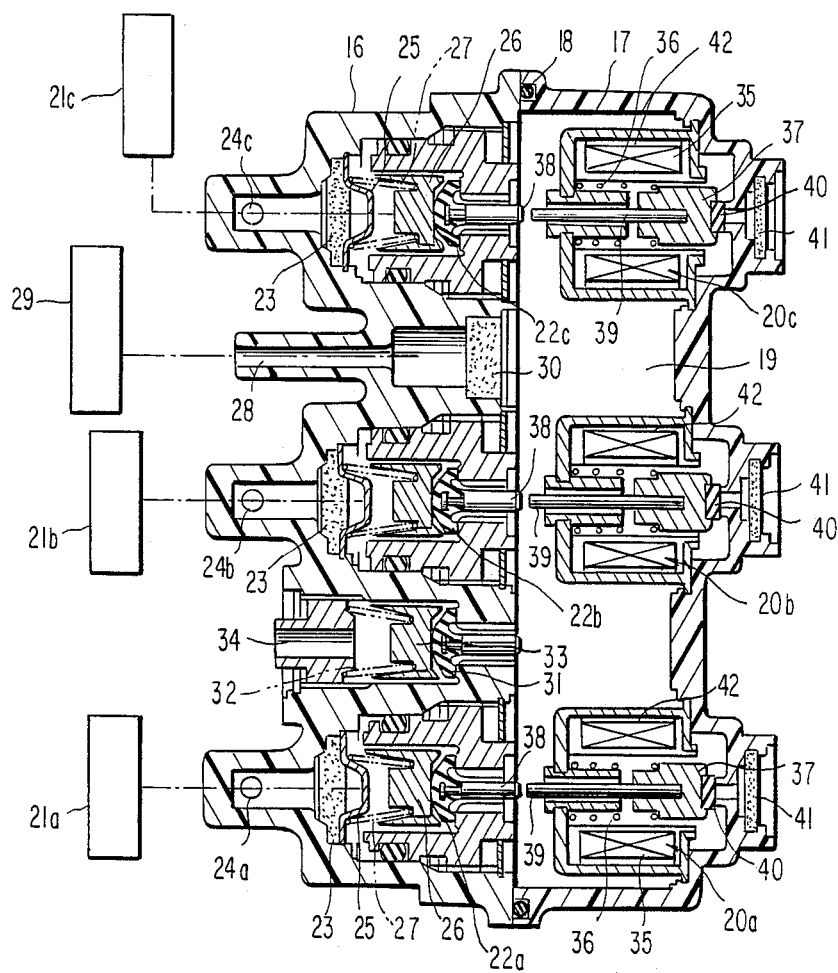
FIG. 3 is a cross-sectional view of a lumbar support air valve assembly according to the present invention.

According to the preferred embodiment of the invention as shown in FIG. 3, the inner valve is adapted to control three air bags 21a, 21b, and 21c. As a practical matter, however, the number of air bags may be varied along with the number of control units within the air valve assembly.

The air valve assembly is comprised of first and second housings 16 and 17, which are connected to each other by any suitable means with a sealed connection provided by the O-ring seal 18. A chamber 19 is defined within the housings 16 and 17 and first, second, and third solenoid actuators 20a, 20b, and 20c, are located therein. Each solenoid actuator is associated with a respective check valve 22a, 22b, and 22c which control the flow of air to the respective air bags 21a, 21b, and 21c. When the check valves 22a, 22b, and 22c are opened by the pressure within the chamber 19, pressurized air is transmitted through the filters 23 and the passages 24a, 24b, and 24c to the respective air bags 21a, 21b, and 21c. Each of the check valves 22a, 22b, and 22c is always urged to its closed condition by means of a guide member 26 by means of a spring 27 inserted between the spring retainer 25 and the spring guide member 26.

An inlet port 28 is disposed in fluid communication with an electro-motive pump 29 for supplying pressurized air to the chamber 19 through the air filter 30. A regulator value 31 is always urged to its closed position by means of a spring guide 33 which is biased by the spring 32. The regulator valve 31 is caused to open when the pressurized air within the chamber 19 exceeds a pre-determined value so that the pressurized air is relieved to the atmosphere at port 34. Therefore, the air pressure within the individual air bags will not increase above the pre-determined value.

Each of the solenoid actuators 20a, 20b, and 20c is provided with a solenoid coil 35 and a plunger 37. Upon energization of the solenoid coil 35 the plunger 37 is moved toward the associated check valve against the force of the spring 36. The plungers 37 are each provided with a push rod 39 which is positioned in alignment with the associated valve rod 38 of the respective check valve. When each plunger is moved upon energization of the solenoid coil, the valve rod 38 is engaged by the push rod 39 to move the associated check valve 22a, 22b, or 22c to the open position. A valve member 40 is provided on the opposite end of each plunger 37 and is adapted to be biased into engagement with a valve seat surrounding an outlet port to the atmosphere by means of the spring 36. Thus, when the plunger 37 is moved by energization of the solenoid coil to open the associated check valve the valve member 40 associated therewith will be moved away from its respective valve seat so that the chamber 19 is brought into communication with the atmosphere through a filter 41 located in the outlet passage.

The lead wires 42 for each solenoid coil 35 are electrically connected to switches which may be located on or near the dashboard. Thus, the on-off operation of these switches enable a remote control of the solenoid actuators in the air valve assembly.

In operation, when the pump 29 is actuated, pressurized air is transmitted to the chamber 19 through the port 28 and the filter 30. The check valves 22a, 22b, and 22c are opened by means of the pressurized air within the chamber 19 so that pressurized air is transmitted to the individual air bags 21a, 21b, and 21c through the filters 23 and passages 24a, 24b, and 24c. When the pressure of the pressurized air within the chamber 19 and the air bags exceeds a pre-determined valve, the regulator valve 31 will open against the force of the spring 32 which has a biasing force larger than that of the springs 27 for the check valves. Thus, the excessive air pressure will be relieved to the atmosphere through the port 34 so that the air pressure within the air bags will not rise above the predetermined value.

When the operator desires to decrease the air pressure within one or more selected air bags positioned in the lumbar region of the seat back, the corresponding switch or switches which are provided on or near the dashboard can be operated to energize the solenoid coil 35 associated therewith. Upon the application of electric current to a selected solenoid 35 the plunger 37 and the push rod 39 will be moved to open the associated check valve and the associated outlet port controlled by the valve member 40. Thus, the air pressure within the air bag corresponding to the above check valve will now be relieved through the check valve, the chamber 19 and the associated valve 40 which is now in the open position.

While the invention has been particularly shown and described with reference to a preferred embodiment thereof, it will be understood by those in the art that various changes in form and details may be made therein without departing from the spirit and scope of the invention.

What is claimed is:

1. A lumbar support air valve assembly comprising a housing having an inlet port adapted to be connected to a source of pressurized air and a plurality of outlet ports each of which is adapted to be disposed in fluid communication with a respective air bag positioned in the lumbar region of a seat back, a plurality of check valves, corresponding in number to the number of outlet ports, are positioned between said inlet port and said outlet ports so as to allow the transmission of air under pressure from said source of air to the respective air bags, and a plurality of solenoid actuators equal in number to said check valves being positioned within said housing adjacent a corresponding check valve with each of said solenoid actuators having a plunger movable in response to the application of electric current which is adapted to cause the associated check valve to move to its open position wherein each check valve is provided with a push rod and each plunger has a push rod connected to one end thereof for engaging the check valve push rod to move said check valve to the open position upon movement of said plunger towards said check valve and further comprising a plurality of exhaust ports each having a filter in said housing adjacent each solenoid actuator for communicating the interior of said housing with the atmosphere and a valve member located on the opposite end of each of said plungers for controlling the flow of pressurized air through the respective exhaust port.

2. A lumbar support air valve assembly as set forth in claim 1 further comprising a pressure relief port located in said housing and pressure relief valve means associated therewith so as to limit the air pressure within said housing and said air bags to a pre-determined value.

* * * * *